(12) United States Patent
Verbridge

(10) Patent No.: US 12,241,538 B2
(45) Date of Patent: Mar. 4, 2025

(54) BEARING ARCHITECTURE FOR HIGH-SPEED MOTOR DRIVE SYSTEMS

(71) Applicant: Rivian IP Holdings, LLC, Irvine, CA (US)

(72) Inventor: Mason Verbridge, Canton, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 394 days.

(21) Appl. No.: 17/706,354

(22) Filed: Mar. 28, 2022

(65) Prior Publication Data
US 2023/0304569 A1  Sep. 28, 2023

(51) Int. Cl.
| | |
|---|---|
| *F16H 57/00* | (2012.01) |
| *F16H 57/021* | (2012.01) |
| *H02K 7/08* | (2006.01) |
| *H02K 7/10* | (2006.01) |

(52) U.S. Cl.
CPC ....... *F16H 57/0018* (2013.01); *F16H 57/021* (2013.01); *H02K 7/08* (2013.01); *H02K 7/1008* (2013.01)

(58) Field of Classification Search
CPC ....... F16H 57/021; H02K 7/08; H02K 7/1008
See application file for complete search history.

(56) References Cited

U.S. PATENT DOCUMENTS

| | | | |
|---|---|---|---|
| 8,870,708 B2 * | 10/2014 | Cha ........................ | B60K 17/04 475/346 |
| 2004/0130224 A1 | 7/2004 | Mogi et al. | |
| 2021/0018087 A1 | 1/2021 | Dellal et al. | |
| 2023/0268794 A1 * | 8/2023 | Kocherscheidt ..... | H02K 5/1732 464/178 |

FOREIGN PATENT DOCUMENTS

| | | | | |
|---|---|---|---|---|
| WO | WO-2022033847 A1 * | 2/2022 | ............ | F16C 19/163 |

OTHER PUBLICATIONS

WO-2022033847-A1_translate (Year: 2022).*

* cited by examiner

*Primary Examiner* — Tulsidas C Patel
*Assistant Examiner* — Mohammed Ahmed Qureshi
(74) *Attorney, Agent, or Firm* — Haley Guiliano LLP

(57) ABSTRACT

A drive system includes a motor and a gearbox. A three-bearing architecture is used to constrain a rotor shaft of the motor and a gear shaft of the gearbox. A first bearing interfacing with the gear shaft, a second bearing interfacing to the rotor shaft, and a central bearing are arranged between the first and second bearings. The central bearing includes a first race section configured to interface with the gear shaft and a second race section for interfacing to the rotor shaft. The first race section and the second race section are separate from each other and may be axially proximate to each other. The gear shaft includes a first section configured to interface with an inner race of the central bearing, and a second section configured to interface with the rotor shaft. The first and second sections are separate and may include the same pitch circle diameter.

19 Claims, 8 Drawing Sheets

BEARING ARCHITECTURE FOR HIGH-SPEED MOTOR DRIVE SYSTEMS

INTRODUCTION

The present disclosure is directed to bearing architectures for motor systems, and, more particularly, to three-bearing systems for a rotor shaft and a gear shaft.

SUMMARY

Torque transfer among shafts arranged an axis requires alignment and constraint of the shafts. Bearings are used to constrain shafts from lateral displacement while allowing rotational motion. For example, a gearbox of an electric vehicle may include a set of gears, which achieve a gear reduction from a rotor shaft of a motor to an output shaft. Each drive axis of the gearbox along which shafts are aligned requires a set of bearings to maintain alignment of the shafts. Along each respective axis, multiple shafts may be engaged to each other and may transfer torque among each other. While two bearings can be used for each shaft, a reduction in the number of total bearings (e.g., from four to three along a drive axis having two shafts), and simplified torque path may help drive reduce the cost and size of system designs, while maintaining serviceability.

The present disclosure is directed to a bearing architecture for a drive system, and more particularly, to a three-bearing architecture having a central bearing that is configured to interface with a gear shaft. In some embodiments, the central bearing includes an inner race having a first race section and a second race section. In some embodiments, the gear shaft is configured to interface with an inner race of the central bearing using splines, and the gear shaft is also configured to interface with a rotor shaft of an electric motor using splines. Because the gear shaft interfaces to the rotor shaft, the central bearing need not be in the torque path between the gear shaft and the rotor shaft. There is direct torque path between the gear shaft and the rotor shaft, for example. Further, because the gear shaft is configured to interface with the inner race of the central bearing at a first section, and configured to interface with the rotor shaft at a second section, the pitch circle diameters of the interfaces at the first section and the second section need not be reduced or nested. In some embodiments, the bearing architectures of the present disclosure allow the gear shaft and the rotor shaft to be installed, removed, or otherwise serviced independent of each other (e.g., without removing both shafts). In some embodiments, splines of the gear shaft at the first section, second section, or both, are crowned to accommodate at least some misalignment among the gear shaft, rotor shaft, and bearing races.

In some embodiments, the present disclosure is directed to an apparatus that includes a three-bearing architecture arranged along an axis. The three-bearing architecture includes a first bearing arranged along an axis, a second bearing arranged along the axis, and a central bearing arranged along the axis. The central bearing includes a first race section configured to interface with a gear shaft, and a second race section configured to interface with a rotor shaft. The first race section and the second race section are separate from each other. In some embodiments, the first bearing is configured to interface with the gear shaft, the second bearing is configured to interface with the rotor shaft, and the central bearing is arranged axially between the first bearing and the second bearings. In some embodiments, the central bearing is not in the torque path between the rotor shaft and the gear shaft, and drive torque is not transmitted through the central bearing. In some embodiments, the first race section of the central bearing includes first splines configured to interface with the gear shaft, and the second race section is configured to form a slip fit with the rotor shaft. In some embodiments, the first race section is configured to interface with the gear shaft using a press fit.

In some embodiments, the first splines are crowned to allow misalignment compliance between the gear shaft and the motor shaft. For example, the axis of the gear shaft and the axis of the rotor shaft may be coincident (e.g., aligned) or slightly skewed (e.g., misaligned), and crowned splines help accommodate off-axis misalignment. In some embodiments, the central bearing maintains a position of the gear shaft when the rotor shaft is removed such that the rotor shaft is independently serviceable. Further, in some embodiments, the central bearing maintains a position of the rotor shaft when the gear shaft is removed such that the gear shaft is independently serviceable. In some embodiments, the first race section includes a first surface area, the second race section includes a second surface area, and the first surface area is greater than the second surface area. For example, the ratio of surface areas may be designed or predetermined, based on the expected radial load ratio.

In some embodiments, the gear shaft includes a first shaft and a stub shaft. The first shaft is configured to interface with the first race section and includes a hollow interior. The stub shaft is configured to be arranged radially within the hollow interior of the first shaft and interfaces to the rotor shaft. The stub shaft is configured to be constrained to rotate with the first shaft (e.g., via splines, keys, press-fit, or any other suitable interface).

In some embodiments, the present disclosure is directed to a gear shaft having a first section and a second section. The first section is configured to interface with an inner race of a central bearing, of a three-bearing architecture. The second section is configured to interface with a rotor shaft of a motor along an axis. For example, the first section and the second section are separate from each other. In some embodiments, the gear shaft is configured to interface with a first bearing, and the rotor shaft is configured to interface with a second bearing. In some such embodiments, the central bearing is configured to be arranged axially between the first bearing and the second bearings.

In some embodiments, the first section includes first splines, and the inner race includes first mating splines configured to interface with the first splines. In some embodiments, the second section includes second splines, and the rotor shaft includes second mating splines configured to interface with the second splines. In some embodiments, the first splines, the second splines, or both are crowned to allow misalignment compliance (e.g., lateral offset and angular misalignment). In some embodiments, the gear shaft is configured to be press fit into the inner race along the first section. In some embodiments, the first section and the second section have the same pitch circle diameter. In some embodiments, the central bearing is not on the torque path between the rotor shaft and the gear shaft. For example, there is a direct torque path between the gear shaft and the rotor shaft.

In some embodiments, the central bearing maintains a position of the gear shaft when the rotor shaft is removed such that the rotor shaft is independently serviceable. To illustrate, in some embodiments, the gear shaft is configured to allow the rotor shaft to be moved axially away from the central bearing while the gear shaft is configured to maintain engagement with the central bearing.

In some embodiments, the gear shaft includes a first shaft and a stub shaft. The first shaft includes the first section and a hollow interior. The stub shaft includes the second section and is configured to be arranged radially within the hollow interior of the first shaft. The stub shaft is configured to be constrained to rotate with the first shaft.

In some embodiments, the present disclosure is directed to an assembly (e.g., of an electric vehicle drivetrain) that includes a motor, a gear shaft, an output shaft. For example, the gear shaft and output shaft may be included as part of a gearbox, and the drive axis corresponding to the gear shaft includes a three-bearing architecture. In some embodiments, the motor includes a rotor shaft and a first bearing, and the gear shaft is configured to engage with the rotor shaft at a first axial end and engage with a second bearing at another axial end. In some such embodiments, the gear shaft includes a first section and a second section at the first axial end, the first section interfaces to an inner race of a central bearing arranged axially between the first bearing and the second bearing. In some embodiments, the second section interfaces to the rotor shaft to transmit torque, and the output shaft is coupled to the gear shaft via a gear reduction to transmit the torque to one or more wheels of an electric vehicle. For example, the first bearing, the second bearing, and the central bearing form a three-bearing architecture. In some embodiments, the gear shaft includes a first shaft and a second shaft (e.g., a stub shaft). The first shaft interfaces to the inner race of the central bearing and includes a hollow interior. The second shaft (e.g., the stub shaft), is arranged radially within the hollow interior of the first shaft and interfaces to the rotor shaft. The second shaft is constrained to rotate with the first shaft.

In some embodiments, the present disclosure is directed to a method for forming a three-bearing architecture. The method includes arranging a first bearing, second bearing, and central bearing along an axis, with the central bearing positioned between the first bearing and the second bearing. The method also includes interfacing a first section of a gear shaft to the central bearing and interfacing a second section of the gear shaft to a rotor shaft. The second section is separate from, and optionally axially offset relative to, the first section.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION OF THE DRAWINGS

Electric motors in electric drive units typically exhibit greater rotational speeds as compared to internal combustion engines, and due to these higher speeds and torques, unique challenges may be presented such as load cases, torque transfer, wear, and gear noise. For example, regarding two-piece shafts (e.g., shafts arranged co-linearly and transmitting torque between each other) may exhibit fretting of splined interfaces. To illustrate, alignment of the two shafts, or lack thereof, may cause or otherwise contribute to spline fretting, pilot fretting, and excessive loads/wear on the bearings constraining the two shafts. Another challenge with respect to single-piece shafts arises from maintaining concentricity of the bearing bores. For example, in some embodiments, each bore corresponds to a separate casting, so practical limits of manufacturing may prevent perfect alignment of the bores (e.g., introduce at least some misalignment). In some circumstances, a reduction from four bearings to three bearings along an axis may provide cost savings, reduce the number of parts, reduce mass, increase efficiency, or a combination thereof. For example, two mating shafts may be joined at a bearing.

Figure 1:
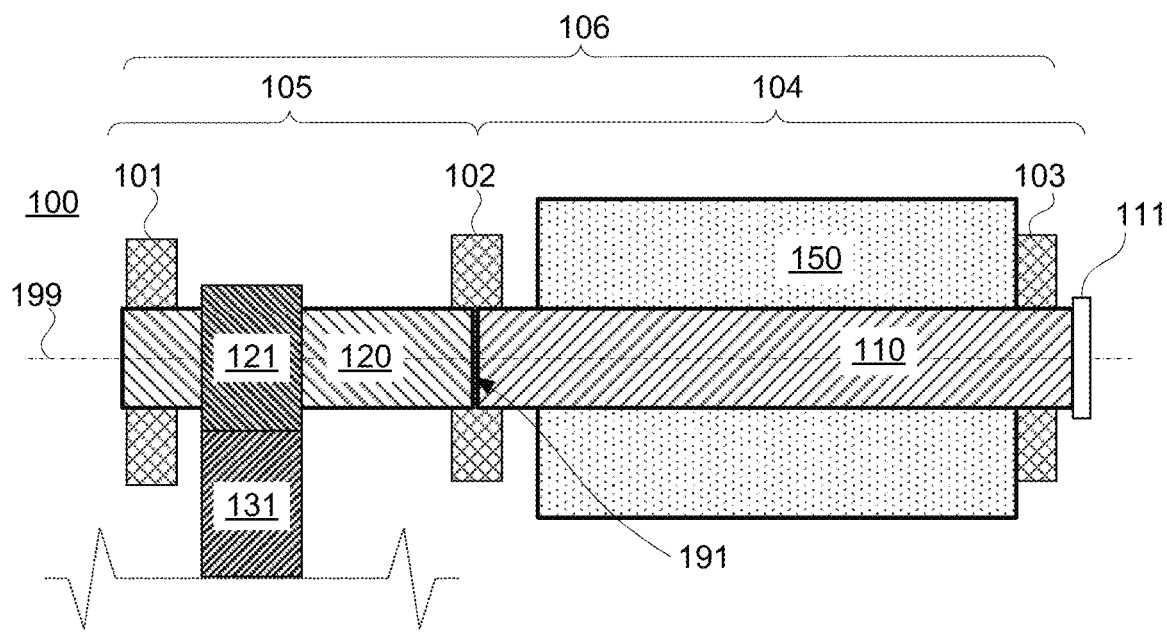
FIG. 1 shows a block diagram of an illustrative motor and gearbox, in accordance with some embodiments of the present disclosure.

FIG. 1 shows a block diagram of illustrative motor 104 and gearbox 105, in accordance with some embodiments of the present disclosure. As illustrated, motor 104 includes rotor shaft 110, body 150 (e.g., which may include a structural frame and stator), and bearing 103. As illustrated, gearbox 105 includes gear shaft 120 with gear 121 (e.g., a first gear), gear 131 (e.g., a second gear, which is configured to engage with gear 121 with a predetermined gear ratio), and first bearing 101. Central bearing 102 may be included as part of gearbox 105, motor 104, or jointly mounted at the interface between gearbox 105 and motor 104. First bearing 101, central bearing 102, and second bearing 103 form a three-bearing architecture for laterally aligning gear shaft 120 and rotor shaft 110 about axis 199. Assembly 100, which includes motor 104 and gearbox 105, along with any other suitable components, may be included as part of a drivetrain of an electric vehicle, for example. As illustrated, gear shaft 120 and rotor shaft 110 form a direct torque path (e.g., central bearing 102 need not be included in torque path 191).

As rotor shaft 110 and gear shaft rotate about axis 199, first bearing 101, central bearing 102, and second bearing 103 constrain off-axis motion. For example, to sufficiently constrain the gear mesh (e.g., between gear 121 and gear 131) under high load in high-torque applications, central bearing 102 is arranged in between the gear shaft and the rotor shaft (e.g., gear shaft 120 and rotor shaft 110). In a further example, inclusion of central bearing 102 may prevent or otherwise reduce noise-vibration-harshness (NVH) noise due to transmission error and sub-optimal contact patch between mating parts. Three-bearing architecture 106 of assembly 100 allows for sufficient constraint of gear shaft 120 and rotor shaft 110 as compared to a two-bearing system, while avoiding the cost and footprint of a fourth bearing (e.g., two bearings for the motor and a separate two bearings for the gear shaft). In some embodiments, gear 121 and gear shaft 120 may be a single component, an assembly, or otherwise be constrained to rotate together.

In some embodiments, the use of a three-bearing architecture may or otherwise allow the possibility of misalignment, because one of the three bearings (e.g., first bearing 101, central 102, and second bearing 103) will not be "in line" with the other two (e.g., a line is defined by two points and may be over-constrained by three). Accordingly, misalignment should be accounted for in the design of a system using a three-bearing architecture, to avoid or otherwise manage high loads transmitted through shafts, bearings, and gears due to improper tolerances, gaps, or mismatched stiffnesses in the system. In some embodiments, by piloting the gear shaft (e.g., gear shaft 120) directly to the central bearing (e.g., bearing 102), the stiffness and positional accuracy may be improved (e.g., optimized), resulting in improved NVH and durability properties. Further, in some embodiments, by also piloting rotor shaft 110 to central bearing 102 instead of to a fourth bearing, power loss, misalignment, and system cost may be reduced. In some embodiments, an axial preload may be applied to second bearing 103 to axially preload rotor shaft 110 (e.g., using element 111 which may be a wave spring or other suitable element). Element 111 is configured to apply an axial preload to rotor shaft 110, biasing rotor shaft 110 against central bearing 102.

In some embodiments, gear shaft 120 includes an external spline configured to interface with rotor shaft 110 (e.g., axially offset from splines configured to interface with gear shaft 120 to central bearing 102), rather than "sandwiching" both rotor shaft 110 and gear shaft 120 under the inner race of the central bearing (e.g., bearing 102). For example, in some such embodiments, the central bearing (e.g., central bearing 102) may retain a smaller pitch circle diameter (PCD), which helps improve power loss, and the splines are able to have a larger PCD, which help improve torsional strength, reduce contact stresses at the splines, and reduce the propensity for spline fretting.

In some embodiments, an assembly includes a three-bearing architecture (e.g., three-bearing architecture 106) that includes a first bearing (e.g., first bearing 101), a central bearing (e.g., central bearing 102), and a second bearing (e.g., second bearing 103), all arranged along an axis (e.g., axis 199). In an illustrative example, electric drive systems for automotive applications may utilize the RPM range and high-speed capabilities of electric motors to stretch a single reduction ratio from zero speed up to a maximum velocity (e.g., the entire speed range). This may lead to high operating speeds of the motor (e.g., rotor shaft 110 thereof), and therefore high cycle counts of revolutions of rotor shaft 110 over the vehicle's life (e.g., which can accelerate wear on rotational-cycle-based failure modes). To illustrate, the designs of the present disclosure may include a gear shaft (e.g., gear shaft 120) or splined stub shaft to absorb inherent misalignment along the drive axis, and remove rotor shaft 110 from the load path induced by misalignment of the three-bearing system (e.g., of first bearing 101, central bearing 102, and second bearing 103).

Figure 5:
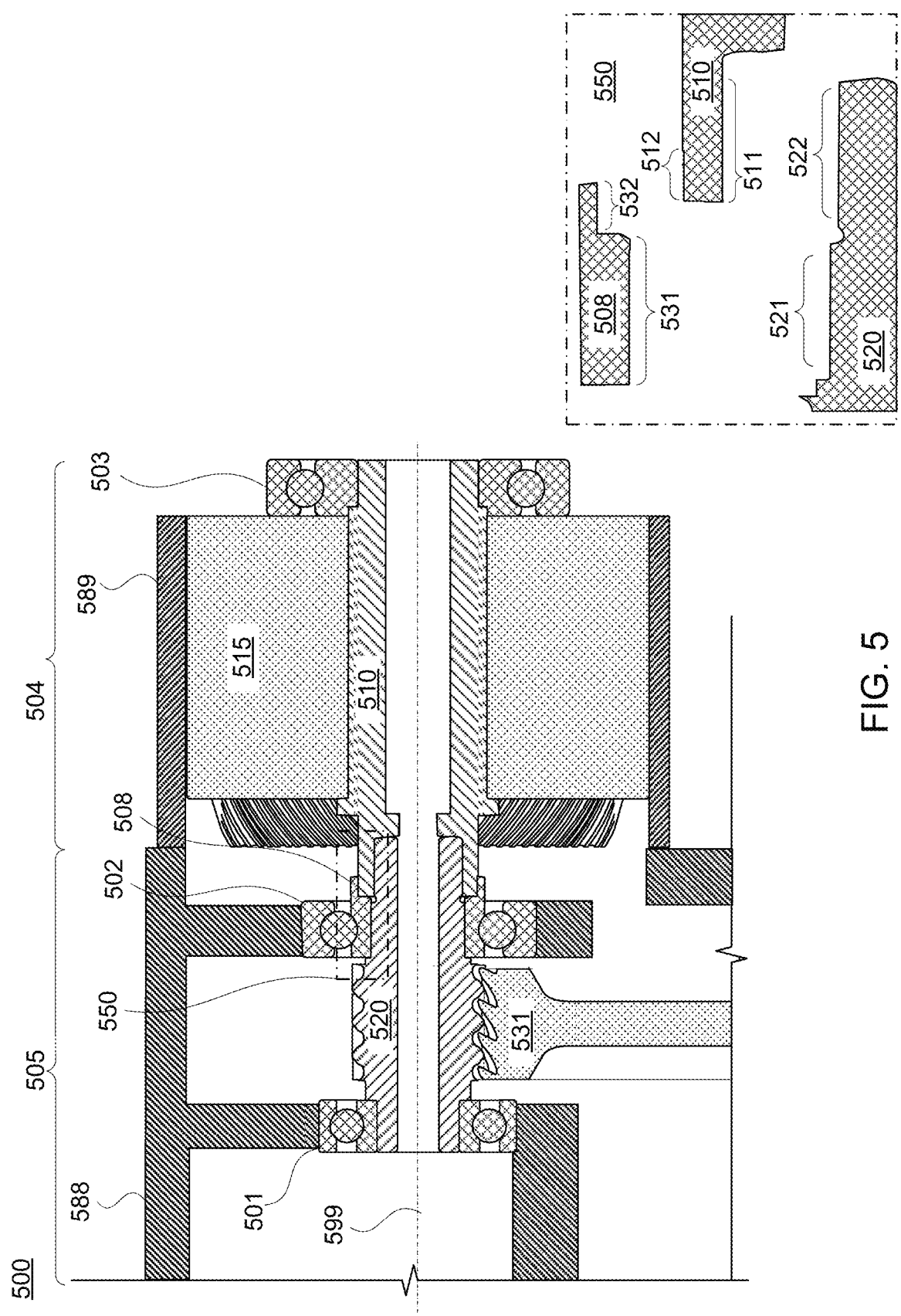
FIG. 5 shows a side cross-sectional view of a portion of an illustrative drive system having a central bearing, along with an enlarged inset, in accordance with some embodiments of the present disclosure.
Figure 6:
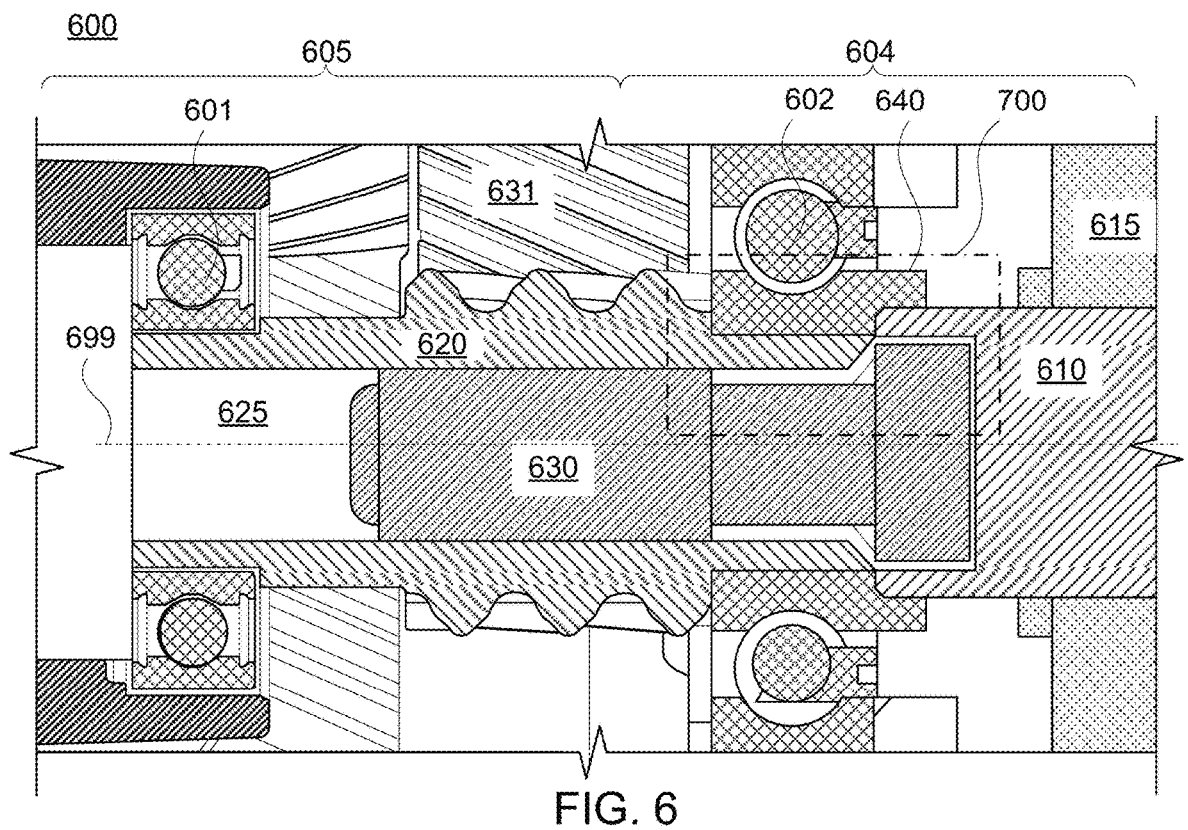
FIG. 6 shows a side cross-sectional view of a portion of an illustrative drive system having an intermediate stub shaft, in accordance with some embodiments of the present disclosure.
Figure 7:
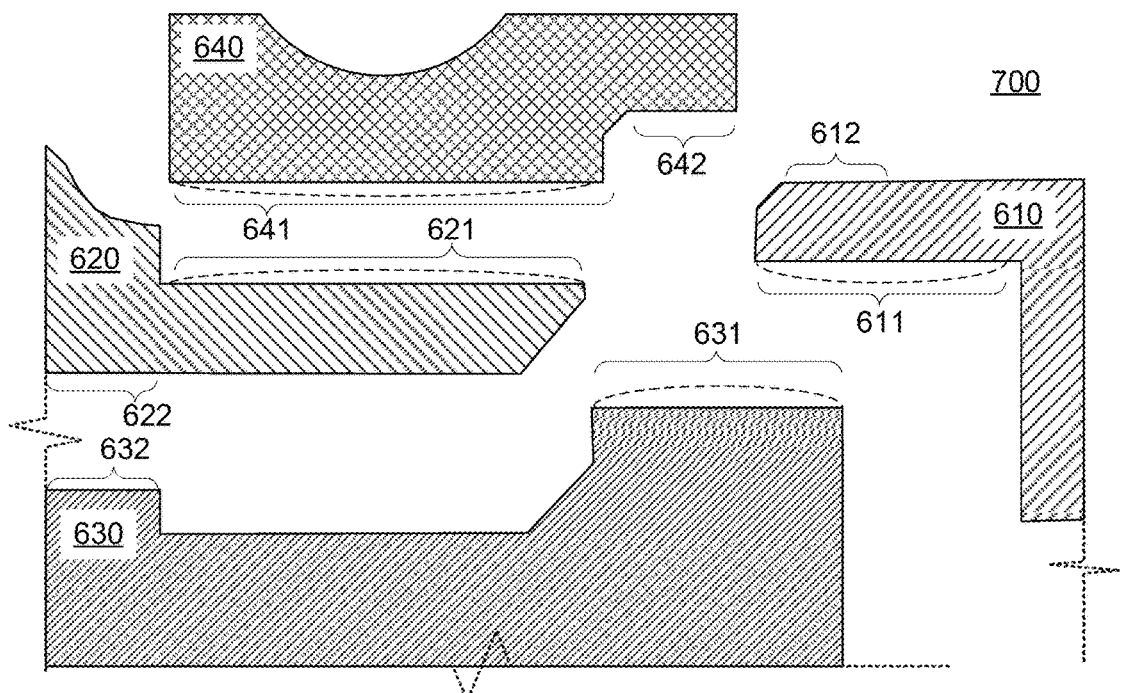
FIG. 7 shows a side cross-sectional view of components of the illustrative drive system of FIG. 6, in an exploded configuration, in accordance with some embodiments of the present disclosure.

In some embodiments, to avoid spline fretting, the designs of the present disclosure may include single-piece input shaft assemblies (e.g., see FIGS. 1, 3-5) or multiple-piece input shaft assemblies (e.g., see FIGS. 6-7). Further, the apparatus of the present disclosure may include various interfaces (e.g., press, slip, fastened, or any other suitable interface type) to mitigate fretting, reduce bearing misalignment, manage stress through the system, or a combination thereof to improve life and efficiency of the system and components thereof.

In some embodiments, rotor shaft 110 and gear shaft 120 are independently serviceable. For example, the central bearing (e.g., central bearing 102) maintains a position of gear shaft 120 when rotor shaft 110, or otherwise motor 104, is removed such that rotor shaft 110 is independently serviceable. In some embodiments, gear shaft 120 may exhibit a relatively simplified locating tolerance stack (e.g., direct to first bearing 101 and central bearing 102). For example, gear shaft 120 may be press fit to first bearing 101, central bearing 102, or both (e.g., at the inner diameter, outer diameter, or a combination thereof).

In an illustrative example, gearbox 105 and motor 104 may be tested independently (e.g., during manufacturing, assembly, or servicing). Because mating components configured to interface with central bearing 102 are not on the torque path between motor 104 and gearbox 105, less material or thinner material layers may be used. Further, a larger spline PCD or shaft diameter may fit within a bearing (e.g., central bearing 102) having a given inner diameter. In some embodiments, rotor shaft 110, gear shaft 120, or both may be press-fit, slip-fit, or otherwise engaged to central bearing 102.

Figure 2:
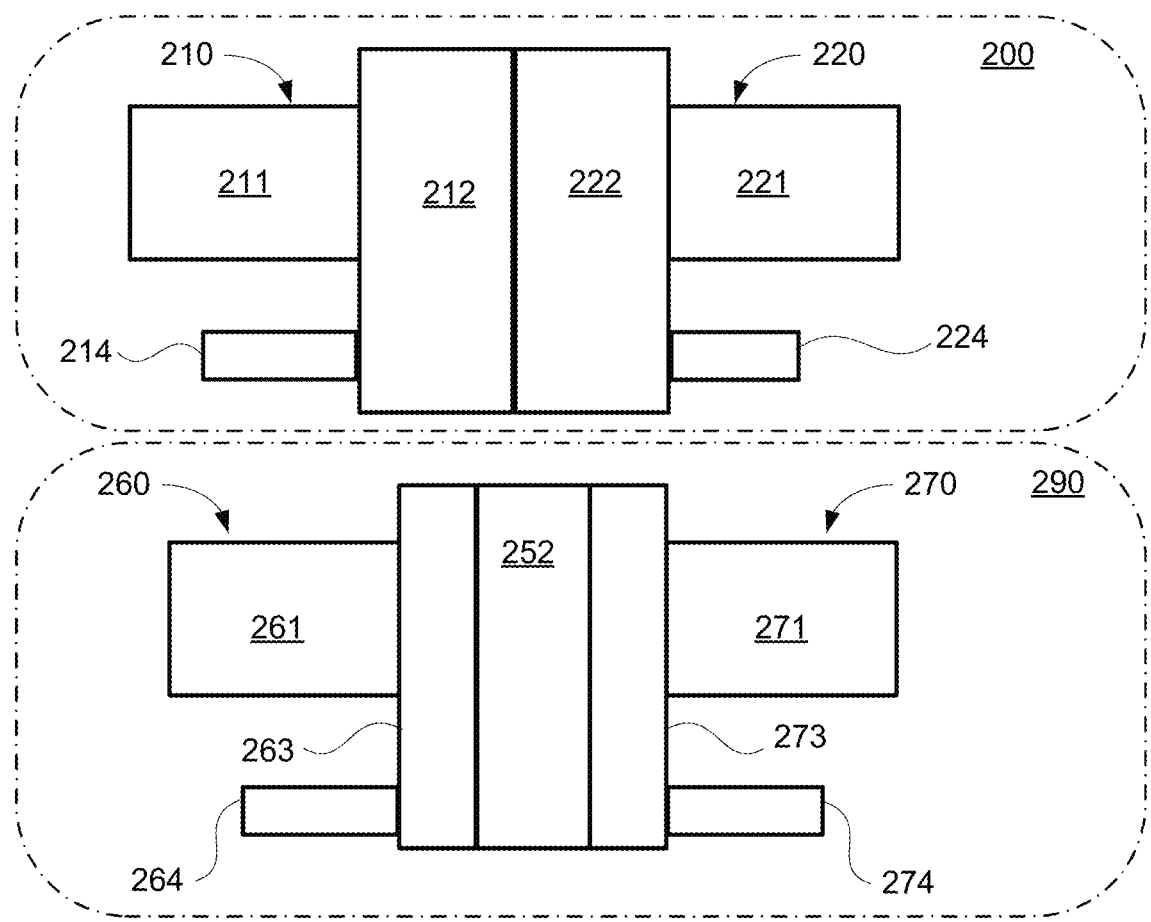
FIG. 2 shows illustrative drive unit configurations, in accordance with some embodiments of the present disclosure.

FIG. 2 shows illustrative drive unit configurations, in accordance with some embodiments of the present disclosure. Each of configurations 200 and 290, or motor drives thereof, may be electric vehicle drivetrains. Configuration 200 includes two separate motor drives 210 and 220, each including a motor (e.g., motors 211 and 221), gearbox (e.g., gearboxes 212 and 222), and output (e.g., outputs 214 and 224, which may include an output spline or output half-shaft). Gearboxes 212 and 222 (e.g., housings thereof) of respective motor drives 210 and 220 may interface to each other to form a stationary housing. In an illustrative example, each of motor drives 210 and 220 may include a respective assembly 100 for driving the respective outputs 214 and 224. To illustrate, three-bearing architecture 106 of FIG. 1 may be included in each of motor drives 210 and 220, which may be relatively wide, to avoid the packaging space required for four-bearing architectures along a drive axis (e.g., two pairs, one for the input gear and one for the motor). To illustrate further, in some circumstances, the packaging benefit of a three-bearing architecture as compared to a four-bearing design may be a ~20% improvement in bearing loss on the input stage (e.g., along the drive axis of the rotor shaft and gear shaft).

Configuration 290 includes motor drives 260 and 270, which are configured to be coupled together by intermediate housing 252. In some embodiments, each of motor drives 260 and 270, while including a motor (e.g., motors 261 and 271), full gearset (e.g., gearsets 263 and 273), and output (e.g., half-shafts 264 and 274), need not be configured for stand-alone operation. In some embodiments, motor drives 260 and 270 need not be sealing. For example, intermediate housing 252 (e.g., I-shield) may be configured to seal against both motor drive 260 and motor drive 270. Intermediate housing 252 may be configured to seal lubricant (e.g., bearing oil), seal coolant (e.g., water, mixtures, oil), provide noise reduction (e.g., attenuate gear-induced audible noise and vibration), align motor drives 260 and 270 to each other, mount motor drives 260 and 270 to a frame or other structural element, house one or more shaft bearings (e.g., one or more bearings for a motor shaft, intermediate shaft, output shaft, or a combination thereof), any other suitable functionality, or any suitable combination thereof. For example, motor drives 260 and 270 may be affixed to intermediate housing 252 using fasteners (e.g., bolts, threaded studs, and nuts), clamps, latches, mechanical interlocks, any other suitable affixments, or any combination thereof. In some embodiments, intermediate housing 252, motor drive 260, motor drive 270, or a combination thereof may include alignment features that spatially align two or more components, constrain relative motion, or both. For example, intermediate housing 252 may allow each of motor drives 260 and 270 to be shorter (e.g., along the left-right axis, as illustrated in FIG. 2).

Figure 3:
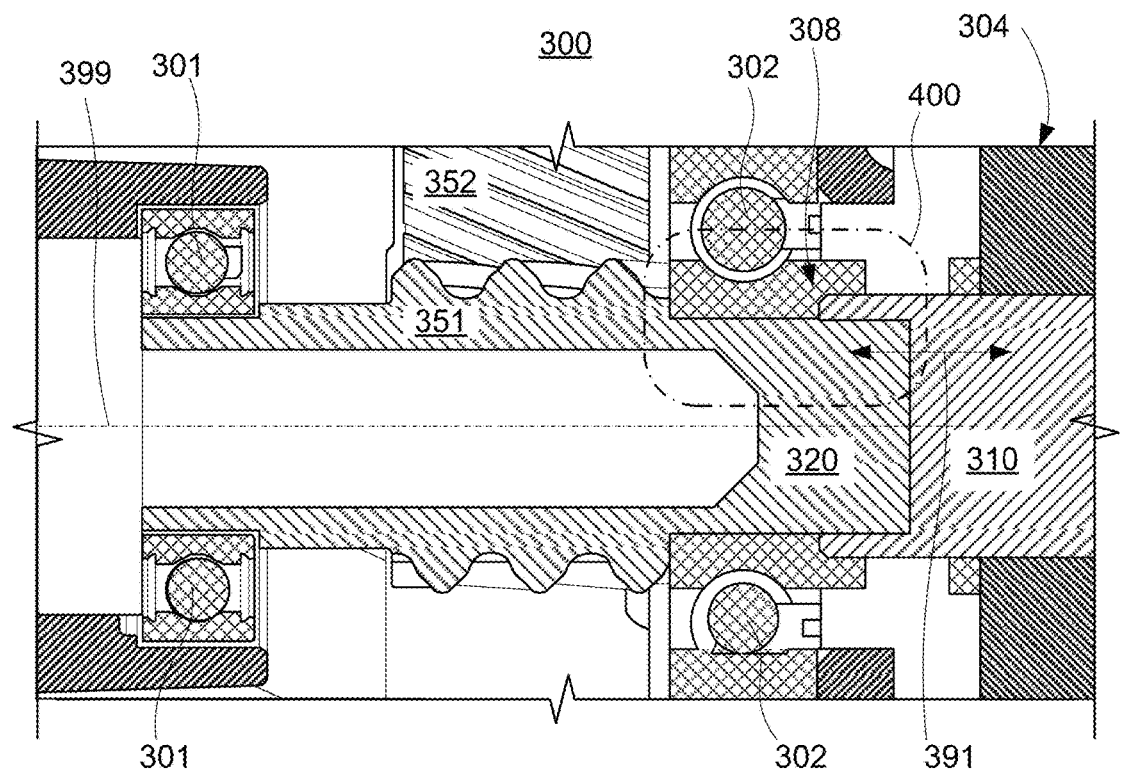
FIG. 3 shows a side cross-sectional view of a portion of an illustrative drive system having a central bearing, in accordance with some embodiments of the present disclosure.
Figure 4:
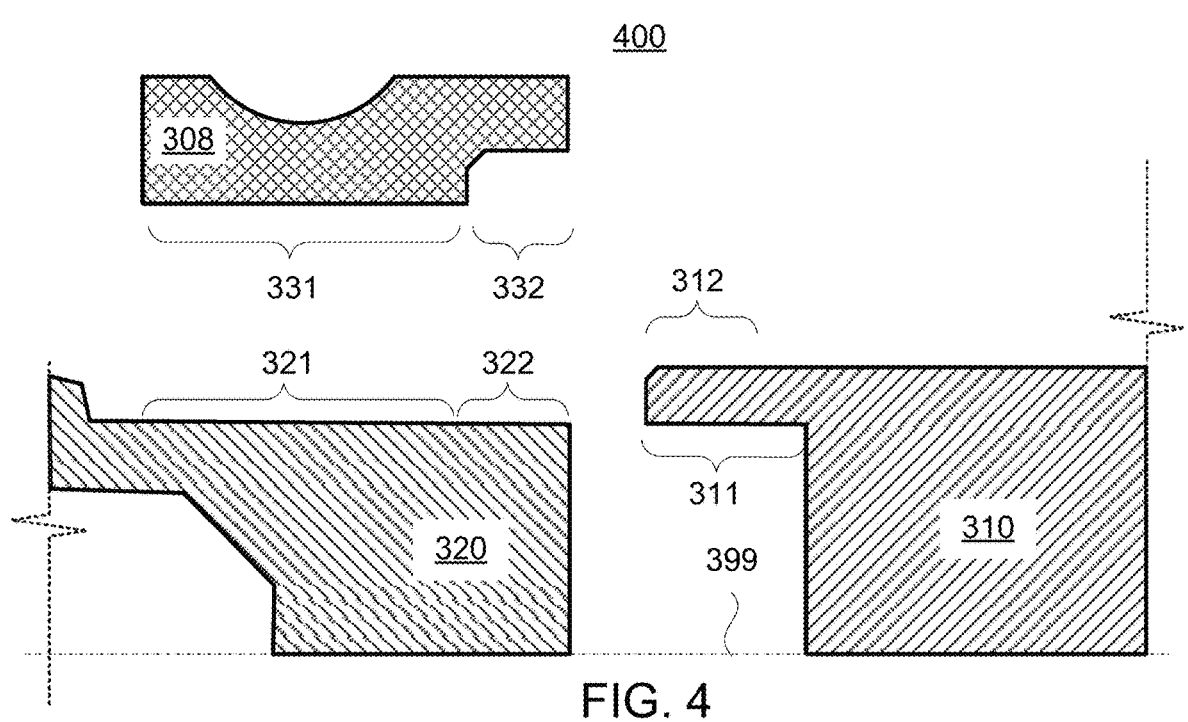
FIG. 4 shows an enlarged side cross-sectional view of a portion the illustrative drive system of FIG. 3, in an exploded configuration, in accordance with some embodiments of the present disclosure.

FIG. 3 shows a side cross-sectional view of a portion of illustrative drive system 300 having central bearing 302, in accordance with some embodiments of the present disclosure. FIG. 4 shows an enlarged side cross-sectional view of a portion the illustrative drive system of FIG. 3, in an exploded configuration, in accordance with some embodiments of the present disclosure. As illustrated, central bearing 302, first bearing 301, and a second bearing (e.g., not shown in FIG. 3, but similarly arranged as second bearing 103 of FIG. 1) form a three-bearing-architecture. The three-bearing architecture constrains rotor shaft 310 and gear shaft 320 to rotate primarily about axis 399. As illustrated, gear shaft 320 includes first section 321 and second section 322, which are separate from each other and optionally axially adjacent to each other. First section 321 interfaces to inner race 308 of central bearing 302 (e.g., a splined interface), while second section 322 interfaces to rotor shaft 310 (e.g., another splined interface). To illustrate, the first section may include splines having a pitch circle diameter (PCD), and the second section may include splines having a pitch circle diameter that may be, but need not be, the same as that of the first section. To illustrate further, the first and second sections need not be radially nested, and inner race 308 need not transfer torque between gear shaft 320 and rotor shaft 310, allowing central bearing 302 to avoid inclusion in the torque path (e.g., torque path 391) between rotor shaft 310 and gear shaft 320. In some embodiments, the axially offset first and second sections allow larger PCD to be used, which allows a reduction in spline length, thus allowing a more axially compact design (e.g., in addition to improvements achieved by using three bearings rather than four). In some embodiments, by allowing rotor shaft 310 to interface to gear shaft 320 at central bearing 302, gear shaft 320 and rotor shaft 310 (e.g., or the entire electric motor to which rotor shaft 310 belongs) may be removed and/or installed independently.

As illustrated in panel 400 of FIG. 4, inner race 308 includes first race section 331 and second race section 332. Race section 331 is configured to interface with gear shaft 320 (e.g., section 321 thereof) via a press-fit interface, slip-fit interface, splined interface, keyed interface, or otherwise engaged interface such that inner race 308 and gear shaft 320 are constrained to rotate together about axis 399. Race section 332 is configured to interface to rotor shaft 310 via a slip fit, or other suitable interface that does not significantly transfer torque. For example, section 322 of gear shaft 320 is configured to engage with section 311 of rotor shaft 310 via a splined interface, keyed interface, or otherwise interface capable of transmitting torque of a drive system. In some embodiments, for example, section 321, section 322, or both may include crowned splines for accommodating misalignment of components along axis 399 (e.g., lateral misalignment, or polar angle misalignment). Section 312 of rotor shaft 310 may interface to inner race 308 via a slip fit, press fit, gap (e.g., an airgap or otherwise a space may exist at the interface), or a combination thereof.

In an illustrative example, drive system 300 may be the same, include components of, or otherwise represent assembly 100 of FIG. 1. For example, each of motor drives 210 and 220 of FIG. 2 may include a respective drive system 300, providing a three-bearing architecture for coupling the respective gear and rotor shafts. In a further example, drive system 300, as illustrated in FIG. 3, may represent a portion of assembly 100 of FIG. 1, with further detailed included at the interface of the gear shaft and rotor shaft. In a further example, first bearing 301 may correspond to first bearing 101, central bearing 302 may correspond to central bearing 102, and drive system 300 may include a bearing not shown in FIG. 3 that corresponds to second bearing 103 of FIG. 1.

In an illustrative example, drive system 300 may offer several benefits over four-bearing designs and other designs. For example, rotor shaft 310 and gear shaft 320 are independently serviceable. In a further example, gear shaft 320 has a simplified locating tolerance stack (e.g., direct to bearing 302). In some embodiments, gear shaft 320 is press fit to inner race 308 of central bearing 302. In some embodiments, drive system 300 need not include retention features (e.g., pins or rings to axially constrain gear shaft 320 or rotor shaft 310).

In some embodiments, rotor shaft 310 may be configured to engage with central bearing 302, and gear shaft 320 may then engage with rotor shaft 310 to transfer torque. As long as one of rotor shaft 310 or gear shaft 320 engage with central bearing 302, and rotor shaft 310 and gear shaft 320 engage with each other to transfer torque, inner race 308 is not part of the drive torque path. Drive system 300 includes first bearing 301 arranged along axis 399, a second bearing (not shown) arranged along axis 399, and central bearing 302 arranged along axis 399, with central bearing 302 arranged in axially in between first bearing 301 and the second bearing. Central bearing 302 includes first race section 331 configured to interface with gear shaft 320, and second race section 332 configured to interface with rotor shaft 310. First race section 331 and second race section 332 are separate from each other (e.g., axially adjacent to each other as illustrated).

In some embodiments, first race section 331 includes first splines for interfacing to gear shaft 320, and second race section 332 forms a slip fit with rotor shaft 310 (e.g., wherein no significant drive torque is transferred). In some embodiments, the first splines are crowned (e.g., curved in profile along axis 399) to allow misalignment compliance between gear shaft 320 and rotor shaft 310 (e.g., to allow some polar angle misalignment off axis 399). In some embodiments, first race section 331 is configured to interface with gear shaft 320 using a press fit. In some embodiments, central bearing 302 is not in the torque path between rotor shaft 310 and gear shaft 320 (e.g., wherein no significant drive torque is transferred). To illustrate, central bearing 302 maintains a position of gear shaft 320 (e.g., a lateral position, and optionally an axial position) when rotor shaft 310 is removed such that t rotor shaft 310 and gear shaft 320 are independently serviceable from each other.

FIG. 5 shows a side cross-sectional view of a portion of illustrative drive system 500 having central bearing 502, along with enlarged inset 550, in accordance with some embodiments of the present disclosure. As illustrated, central bearing 502, first bearing 501 (e.g., interfaced to gear shaft 520), and second bearing 503 (e.g., a second bearing interfaced to rotor shaft 510) form a three-bearing-architecture. The three-bearing architecture constrains rotor shaft 510 and gear shaft 520 to rotate primarily about axis 599. As illustrated, gear shaft 520 includes section 521 (e.g., a first section) and section 522 (e.g., a second section), which are separate from each other and optionally axially adjacent to each other. To illustrate, sections 521 and 522 are arranged at one axial end of gear shaft 520 and are adjacent to each other. Collectively, sections 521 and 522 form an interface between gear shaft 520, rotor shaft 510, and inner race 508. Section 521 interfaces to inner race 508 of central bearing 502 (e.g., via a splined interface), while section 522 interfaces to rotor shaft 510 (e.g., via another splined interface). To illustrate, the sections 521 and 522 may each include splines having a respective PCD, which may be, but need not be the same. To illustrate further, sections 521 and 522 are not radially nested, and gear shaft 520 and rotor shaft 510 need not engage with each other within the PCD interface between gear shaft 520 and inner race 508. Accordingly, the interface between gear shaft 520 and rotor shaft 510 may exhibit a PCD as large as, or larger, than the PCD corresponding to the interface between gear shaft 520 and inner race 508. Inner race 508 need not engage with (e.g., transmit torque to and from) both gear shaft 520 and rotor shaft 510, allowing central bearing 502 to avoid inclusion in the torque path between rotor shaft 510 and gear shaft 520. In some embodiments, the axially offset first and second sections allow larger PCD to be used, which allows a reduction in spline length, thus allowing a more axially compact design (e.g., in addition to improvements achieved by using three bearings rather than four). In some embodiments, by allowing rotor shaft 510 to interface to gear shaft 520 at central bearing 502, gear shaft 520 and rotor shaft 510 (e.g., or the entire electric motor to which rotor shaft 510 belongs) may be removed and/or installed independently.

As illustrated in FIG. 5, motor 504 includes, or is otherwise affixed to, housing 589. Housing 589 is affixed to housing 588 of gearbox 505. For example, housings 588 and 589 may be stationary, while rotor shaft 510 and gear shaft 520 may rotate about axis 599. Motor 504 includes stator 515 (e.g., which includes windings, stator teeth, laminations, any other suitable components, or combination thereof), rotor shaft 510, and second bearing 503. In an illustrative example, drive system 500 may be the same, include components of, or otherwise represent drive system 300 of FIG. 3, or assembly 100 of FIG. 1. In a further example, each of motor drives 210 and 220 of FIG. 2 may include a respective drive system 500, providing a three-bearing architecture for coupling the respective gear and rotor shafts. In a further example, first bearing 501 may correspond to first bearing 101 of FIG. 1, central bearing 502 may correspond to central bearing 102 of FIG. 1, and second bearing 503 may correspond to second bearing 103 of FIG. 1.

In some embodiments, drive system 500 may be, or otherwise be included as part of, an electric vehicle drivetrain. The electric vehicle drivetrain includes motor 504, gearbox 505 (e.g., which includes gear shaft 520), and an output shaft shown in part by gear 531 of FIG. 5 (e.g., or as either of outputs 214 or 224 of FIG. 2). Motor 504 includes rotor shaft 510 and a bearing (e.g., corresponding to second bearing 103). Gear shaft 520 is configured to engage with rotor shaft 510 at a first axial end (e.g., an end of gear shaft 520 along axis 599), and to engage with first bearing 501 at another axial end (e.g., the opposite end of gear shaft 520 along axis 599). Gear shaft 520 includes a first section (e.g., corresponding to first section 321 of FIG. 3) and a second section (e.g., corresponding to second section 322 of FIG. 3) at the first axial end. The first section interfaces to an inner race (e.g., corresponding to inner race 308 of FIG. 3) of central bearing 502 arranged axially between first bearing 501 and the second bearing (not shown in FIG. 5). The second section interfaces to rotor shaft 510 to transmit torque, and the output shaft (e.g., gear 531, and optionally another gear coupled to gear 531) is coupled to gear shaft 510 via a gear reduction to transmit the torque to one or more wheels of an electric vehicle.

In some embodiments, as illustrated, drive system 500 includes first bearing 501 arranged along axis 599, second bearing 503 arranged along axis 599, and central bearing 502 arranged along axis 599, with central bearing 502 arranged in axially in between first bearing 501 and second bearing 503. Central bearing 502 includes first race section 531 configured to interface with section 521 of gear shaft 520, and second race section 532 configured to interface with section 512 of rotor shaft 510 (e.g., as illustrated in inset 550). First race section 531 and second race section 532 are axially offset from each other (e.g., axially adjacent to each other as illustrated). Section 522 of gear shaft 520 configured to interface with section 511 of rotor shaft 510 via splines, keys, or any other suitable interface that allows gear shaft 520 and rotor shaft 510 to rotate together but be disconnected axially (e.g., during servicing).

In some embodiments, drive system 500 is the same as drive system 300 of FIG. 3. For example, drive system 500 includes first bearing 501 arranged along axis 599, second bearing 503 arranged along axis 599, and central bearing 502 arranged along axis 599, with central bearing 502 arranged in axially in between first bearing 501 and second bearing 503. Central bearing 502 includes a first race section (e.g., similar to first race section 331 of FIG. 3) configured to interface with gear shaft 520), and a second race section (e.g., similar to second race section 332 of FIG. 3) configured to interface with rotor shaft 510. The first race section and the second race section are separate from each other (e.g., axially adjacent to each other as illustrated). First bearing 501 is configured to interface with gear shaft 520, while the second bearing is configured to interface with rotor shaft 510 (e.g., at an axial end of rotor shaft 510 distal to central bearing 502).

FIG. 6 shows a side cross-sectional view of a portion of illustrative drive system 600 having intermediate stub shaft 670, in accordance with some embodiments of the present disclosure. FIG. 7 shows a side cross-sectional view of components of illustrative drive system 600 of FIG. 6, in an exploded configuration, in accordance with some embodiments of the present disclosure. As illustrated, central bearing 602, first bearing 601, and another bearing (e.g., not shown in FIGS. 6-7, but similarly arranged as second bearing 103 of FIG. 1) form a three-bearing-architecture. The three-bearing architecture constrains rotor shaft 610 and first shaft 620 to rotate primarily about axis 699. As illustrated, first shaft 620 and stub shaft 630 together form a gear shaft (e.g., similar to gear shaft 320 of FIG. 3, although including two parts). As illustrated, first shaft 620 includes section 621 and section 622, which are axially offset from, or otherwise separate from, each other and optionally axially adjacent to each other. Section 621 interfaces to section 641 of inner race 640 of central bearing 602 (e.g., a splined interface), while section 622 interfaces to section 632 of stub shaft 630 (e.g., another splined interface). To illustrate, section 621 may include splines having a pitch circle diameter (PCD), and section 631 if stub shaft 630 may include splines having a pitch circle diameter that may be, but need not be, the same as that of section 621. To illustrate further, sections 621 and 631 need not be radially nested, and inner race 640 need not interface to both first shaft 620 and rotor shaft 610 in a manner that transmits significant torque, allowing central bearing 602 to avoid inclusion in the torque path between rotor shaft 610 and first shaft 620. In some embodiments, sections 621 and 631 are axially offset to allow larger PCDs to be used, which allows a reduction in spline length, thus allowing a more axially compact design (e.g., in addition to improvements achieved by using three bearings rather than four). In some embodiments, by engaging rotor shaft 610 to stub shaft 630, and stub shaft 630 to first shaft 620 at central bearing 602, rotor shaft 610 (e.g., or the entire electric motor to which rotor shaft 610 belongs) may be removed and/or installed independently of stub shaft 630 and first shaft 620. In some embodiments, stub shaft 630 may include a recess or hollow region (not illustrated) allowing lubricating oil to flow axially.

As illustrated in panel 700 of FIG. 7, inner race 640 includes first race section 641 and second race section 642. Race section 641 is configured to interface with first shaft 620 (e.g., section 621 thereof) via a press-fit interface, slip-fit interface, splined interface, keyed interface, or otherwise engaged interface such that inner race 640 and first shaft 620 are constrained to rotate together about axis 699. Race section 642 is configured to interface to rotor shaft 610 (e.g., at section 612 of rotor shaft 610) via a slip fit, or other suitable interface that does not significantly transfer torque. For example, section 631 of stub shaft 630 is configured to engage with section 611 of rotor shaft 610 via a splined interface, keyed interface, or otherwise interface capable of transmitting torque of a drive system. In some embodiments, for example, sections 621, 622, 631, 632, 641, 642, 611, and 612, or a combination thereof may include crowned splines for accommodating misalignment of components along axis 699 (e.g., lateral misalignment, or polar angle misalignment).

In an illustrative example, drive system 600 may be the same, include components of, or otherwise represent assembly 100 of FIG. 1. For example, each of motor drives 210 and 220 of FIG. 2 may include a respective drive system 600, providing a three-bearing architecture for coupling the respective gearboxes and rotor shafts. In a further example, drive system 600, as illustrated in FIGS. 6-7, may represent a portion of assembly 100 of FIG. 1, with further detailed included at the interface of the gear shaft (e.g., the combination of first shaft 620 and stub shaft 630) and rotor shaft. In a further example, first bearing 601 may correspond to first bearing 101, central bearing 602 may correspond to central bearing 102, and drive system 600 may include a bearing not shown in FIGS. 6-7 that corresponds to second bearing 103 of FIG. 1.

In an illustrative example, stub shaft 630 may include crowning on splines at section 631 to improve misaligned shaft torque capacity (e.g., at the interface with section 611 of rotor shaft 610). In some embodiments, for example, stub shaft 630 serves as the misalignment compliance component on the torque path between rotor shaft 610 and first shaft 620. In some embodiments, the three-bearing architecture provides adequate stiffness support of input gear position (e.g., stiffness for first shaft 620). In some embodiments, the geometry of stub shaft 630 is tuned to provide desired damping, frequency response, strength, stiffness, or a combination thereof. To illustrate, the modularity of components of drive system 600 and interfaces among components of drive system 600 may provide for relatively simplified testing fixture design, ease of use in automotive and stationary power systems, or a combination thereof. For example, the gearbox 605 and motor 604 may be tested independently, for example, during a manufacturing process, assembly process, servicing, installation, component replacement, or a combination thereof. In a further example, because the mating components configured to interface with the central bearing aren't on the torque path, less material layers or material thickness is needed at these locations (e.g., sections 641 and 642 of inner race 640). Accordingly, a relatively larger spline PCD, or shaft may fit within a given size bearing (e.g., having a given inner diameter of inner race). In some embodiments, first shaft 620 and rotor shaft 610 interface to central bearing 602 in a manner that allows independent servicing, ease of assembly, and desired operation.

As illustrated, first shaft 620 includes section 621 (e.g., a first section) and hollow interior 625. Stub shaft 630 includes section 631 (e.g., a second section). Stub shaft 630 is arranged radially within hollow interior 625 of first shaft 620, and stub shaft 630 is constrained to rotate with first shaft 620.

Figure 8:
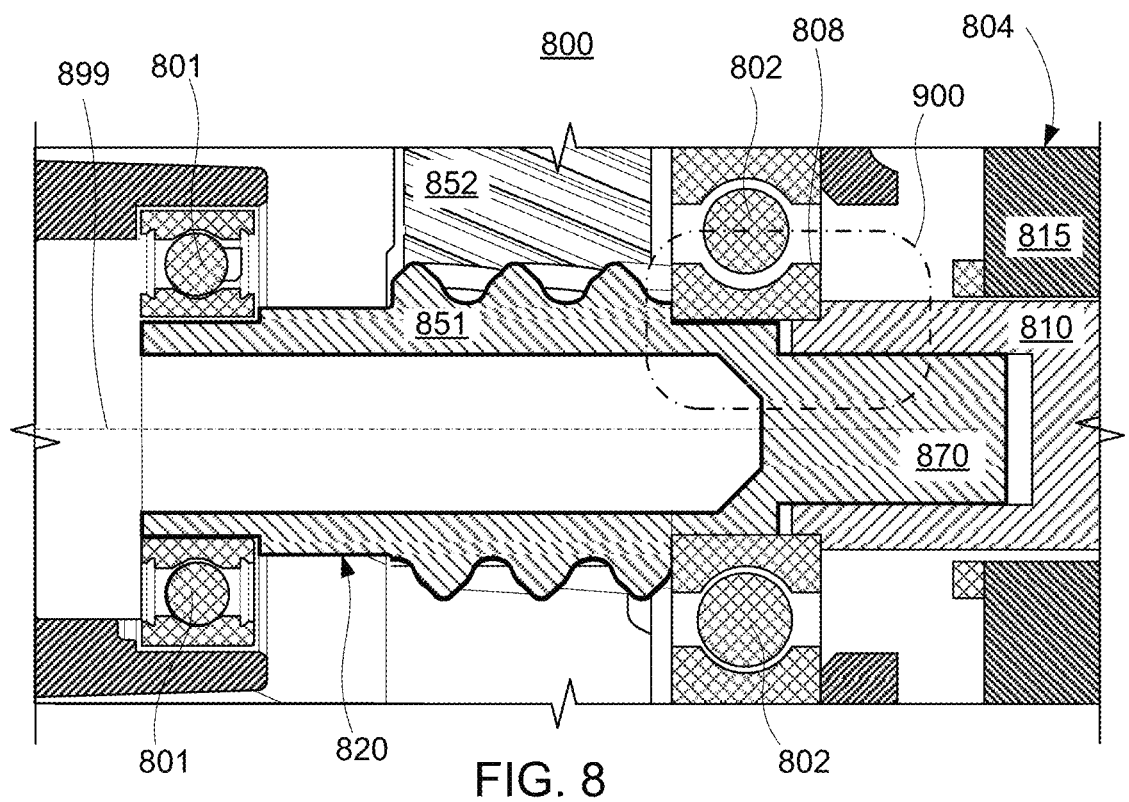
FIG. 8 shows a side cross-sectional view of a portion of an illustrative drive system having an extension, in accordance with some embodiments of the present disclosure.
Figure 9:
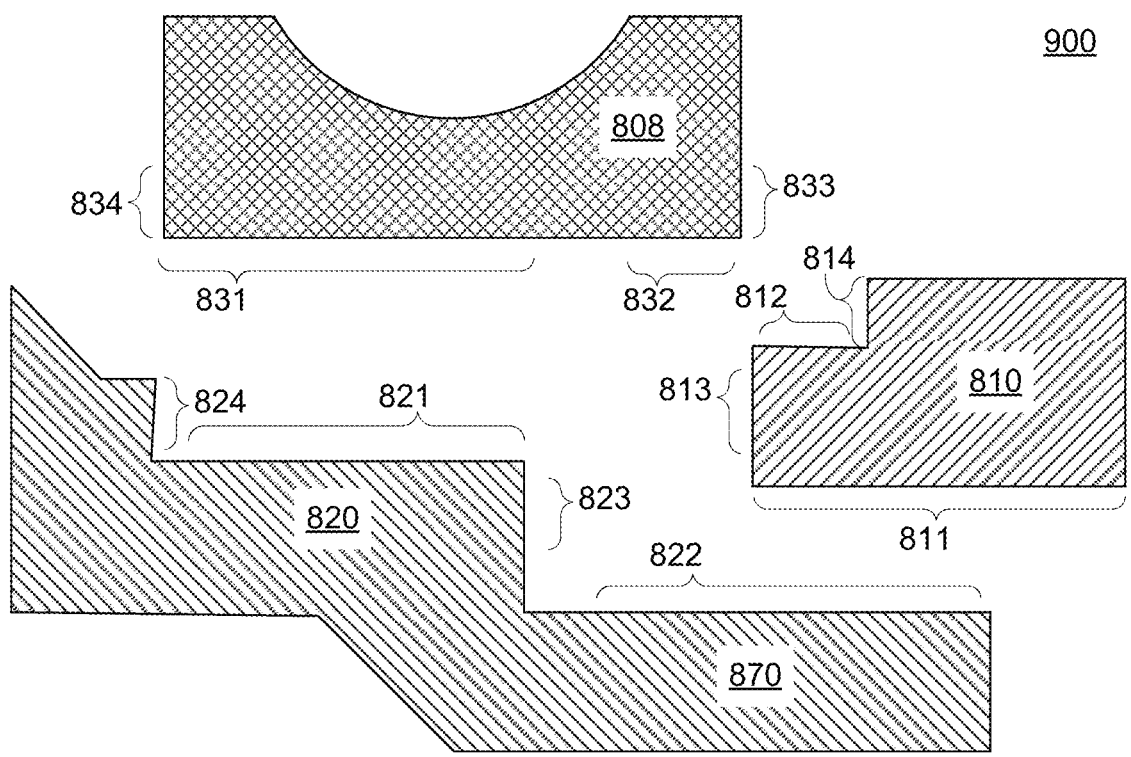
FIG. 9 shows a side cross-sectional view of components of the illustrative drive system of FIG. 8, in an exploded configuration, in accordance with some embodiments of the present disclosure.

FIG. 8 shows a side cross-sectional view of a portion of illustrative drive system 800 having extension 870, in accordance with some embodiments of the present disclosure. FIG. 9 shows a side cross-sectional view of components of illustrative drive system 800 of FIG. 8, in an exploded configuration, in accordance with some embodiments of the present disclosure. As illustrated, central bearing 802, first bearing 801 (e.g., interfaced to gear shaft 820), and a second bearing (e.g., the second bearing not illustrated but interfaced to rotor shaft 810) form a three-bearing-architecture. The three-bearing architecture constrains rotor shaft 810 and gear shaft 820 to rotate primarily about axis 899. As illustrated, gear shaft 820 includes section 821 (e.g., a first section) and section 822 (e.g., a second section), which are axially offset from, or otherwise separate from, each other and optionally axially adjacent to each other. To illustrate, sections 821 and 822 are arranged at one axial end of gear shaft 820 and are adjacent to each other. Collectively, sections 821 and 822 form an interface between gear shaft 820, rotor shaft 810, and inner race 808 (e.g., a radially inner portion of a bearing having an inner diameter configured to interface with a shaft). Section 821 interfaces to inner race 808 of central bearing 802 (e.g., via a splined interface), while section 822 interfaces to rotor shaft 810 (e.g., via another splined interface). To illustrate, the sections 821 and 822 may each include splines having a respective PCD, which may be, but need not be the same. To illustrate further, sections 821 and 822 are not radially nested, and gear shaft 820 and rotor shaft 810 need not engage with each other within the PCD interface between gear shaft 820 and inner race 808. Accordingly, the interface between gear shaft 820 and rotor shaft 810 may exhibit a PCD as large as, or larger, than the PCD corresponding to the interface between gear shaft 820 and inner race 808. Inner race 812 need not engage with (e.g., transmit torque to and from) both gear shaft 820 and rotor shaft 810, allowing central bearing 802 to avoid inclusion in the torque path between rotor shaft 810 and gear shaft 820. In some embodiments, the axially offset first and second sections allow larger PCD to be used, which allows a reduction in spline length, thus allowing a more axially compact design (e.g., in addition to improvements achieved by using three bearings rather than four). In some embodiments, by allowing rotor shaft 810 to interface to gear shaft 820 at central bearing 802, gear shaft 820 and rotor shaft 810 (e.g., or the entire electric motor to which rotor shaft 810 belongs) may be removed and/or installed independently.

In some embodiments, motor 804 includes a housing that may be stationary, while rotor shaft 810 and gear shaft 820 may rotate about axis 899. Motor 804 includes stator 815 (e.g., which includes windings, stator teeth, laminations, any other suitable components, or combination thereof), rotor shaft 810, and the second bearing. In an illustrative example, drive system 800 may be the same, include components of, or otherwise represent drive system 300 of FIG. 3, or assembly 100 of FIG. 1. In a further example, each of motor drives 210 and 220 of FIG. 2 may include a respective drive system 800, providing a three-bearing architecture for coupling the respective gear and rotor shafts. In a further example, first bearing 801 may correspond to first bearing 101 of FIG. 1, central bearing 802 may correspond to central bearing 102 of FIG. 1, and the second bearing of drive system 800 may correspond to second bearing 103 of FIG. 1.

In some embodiments, drive system 800 may be, or otherwise be included as part of, an electric vehicle drivetrain. The electric vehicle drivetrain includes motor 804, a gearbox (e.g., which includes gear shaft 820), and an output shaft shown in part by gear 852 (e.g., which engages with gear 851 of gear shaft 820, or otherwise corresponds to either of outputs 214 or 224 of FIG. 2). Motor 804 includes rotor shaft 810 and a bearing (e.g., corresponding to second bearing 103). Gear shaft 820 is configured to engage with rotor shaft 810 at a first axial end (e.g., an end of gear shaft 820 along axis 899), and to engage with first bearing 801 at another axial end (e.g., the opposite end of gear shaft 820 along axis 899). Gear shaft 820 includes a first section (e.g., section 821 corresponding to first section 321 of FIG. 3) and a second section (e.g., section 822 corresponding to second section 322 of FIG. 3) at the first axial end. The first section interfaces to an inner race (e.g., inner race 808 corresponding to inner race 308 of FIG. 3) of central bearing 802 arranged axially between first bearing 801 and the second bearing (not shown in FIG. 8). The second section interfaces to rotor shaft 810 to transmit torque, and the output shaft (e.g., gear 852, and optionally another gear coupled to gear 852) is coupled to gear shaft 810 via a gear reduction (e.g., from gear 851 to gear 852) to transmit the torque to one or more wheels of an electric vehicle.

In some embodiments, as illustrated, drive system 800 includes first bearing 801 arranged along axis 899, a second bearing arranged along axis 899, and central bearing 802 arranged along axis 899, with central bearing 802 arranged in axially in between first bearing 801 and the second bearing. Central bearing 802 (e.g., inner race 808 thereof) includes first race section 831 configured to interface with section 821 of gear shaft 820, and second race section 832 configured to interface with section 812 of rotor shaft 810 (e.g., as illustrated in panel 900 of FIG. 9). First race section 831 and second race section 832 are separate from each other (e.g., axially adjacent to each other as illustrated). Section 822 of gear shaft 820 interfaces to section 811 of rotor shaft 810 via splines, keys, or any other suitable interface that allows gear shaft 820 and rotor shaft 810 to rotate together but be disconnected axially (e.g., during servicing).

In some embodiments, drive system 800 is the same as, or otherwise similar to, drive system 300 of FIG. 3. For example, drive system 800 includes first bearing 801 arranged along axis 899, a second bearing 803 arranged along axis 899, and central bearing 802 arranged along axis 899, with central bearing 802 arranged in axially in between first bearing 801 and a second bearing. Central bearing 802 includes first race section 831 (e.g., similar to first race section 331 of FIG. 3) configured to interface with gear shaft 820), and second race section 332 (e.g., similar to second race section 332 of FIG. 3) configured to interface with rotor shaft 810. First race section 831 and second race section 832 are separate from each other (e.g., axially adjacent to each other as illustrated), and may exhibit different diameters or the same diameter (as illustrated). First bearing 801 is configured to interface with gear shaft 820, while the second bearing is configured to interface with rotor shaft 810 (e.g., at an axial end of rotor shaft 810 distal to central bearing 802).

In an illustrative example, drive system 800 may be assembled using press fit interfaces. In some embodiments, gear shaft 820 is axially pressed into inner race 808 of central bearing 802. In some embodiments, gear shaft 820 is axially pressed into inner race 808, and axial face 814 of rotor shaft 810 is axially preloaded against axial face 833 of inner race 808. For example, rotor shaft 810 may be preloaded using an axial press fit (e.g., as the second bearing is secured in placed), a wave spring or other suitable axial spring, or any other suitable component or configuration that exerts an axial preload on rotor shaft 810. In some embodiments, extension 870 of gear shaft 820 extends axially into a recess or cavity of rotor shaft 810 (e.g., an extension may be defined as a portion of either a gear shaft or rotor shaft that extends axially into the other shaft). In some embodiments, axial face 824 of gear shaft 820 may pressed against or otherwise interface to axial face 834 of inner race 808. In some embodiments, axial face 823 of gear shaft 820 may be configured to form a gap with axial face 813 of rotor shaft 810. For example, the gap may prevent gear shaft 820 and rotor shaft 810 from axially preloading against each other, but rather each axially preloads to inner race 808. As used herein, an axial face refers to an axially facing surface (e.g., whether flat, a flat section, a curved section, or otherwise a surface having a primarily axial facing normal vector). Sections 822 and 811 may interface at a splined interface, keyed interface, or other suitable interface capable of transmitting torque between gear shaft 820 and rotor shaft 810.

In a further illustrative example, inner race 808 may include a total surface area defined by race sections 831 and 832, and optionally other sections (e.g., between or on either side of race sections 831 and 832). The proportion of contact area of race sections 831 and 832 may be a design parameter. For example, the area ratio of race section 831 to race section 832 (e.g., 831:832, in percent) may be 75:25, 80:20, 70:30, 50:50, or any other suitable ratio. In a further example, if race section 831 has an axial length of A, and race section 832 has an axial length of B, A may range from 50-90 percent, and B may range from 10-50 percent. To illustrate, in some embodiments, gear shaft 820 experiences relatively greater off-axis loads (e.g., lateral loads directed off of axis 899, or "radial loads") than rotor shaft 810, caused by gear 852, and accordingly race section 831 may be longer than (e.g., has more contact area than) race section 832. The ratio of race sections (e.g., areas or lengths thereof) may be applied to any of the drive systems of the present disclosure. For example, the area ratio between race sections 831 and 832 may correspond to a radial load ratio (e.g., an expected or designed for radial load ratio). To illustrate, because gear shaft 820 may be relatively more sensitive to mis-location than rotor shaft 810 (e.g., due to lateral loads), load may be transferred between inner race 808 and gear shaft 820 through a relatively larger surface area. In some embodiments, inner race 808 may include an inner surface (e.g., that includes race sections 831 and 832) that is a cylindrical recess (e.g., without steps or other features). Any suitable bearing having a suitable inner surface may be used as central bearing 802, for example.

Figure 10:
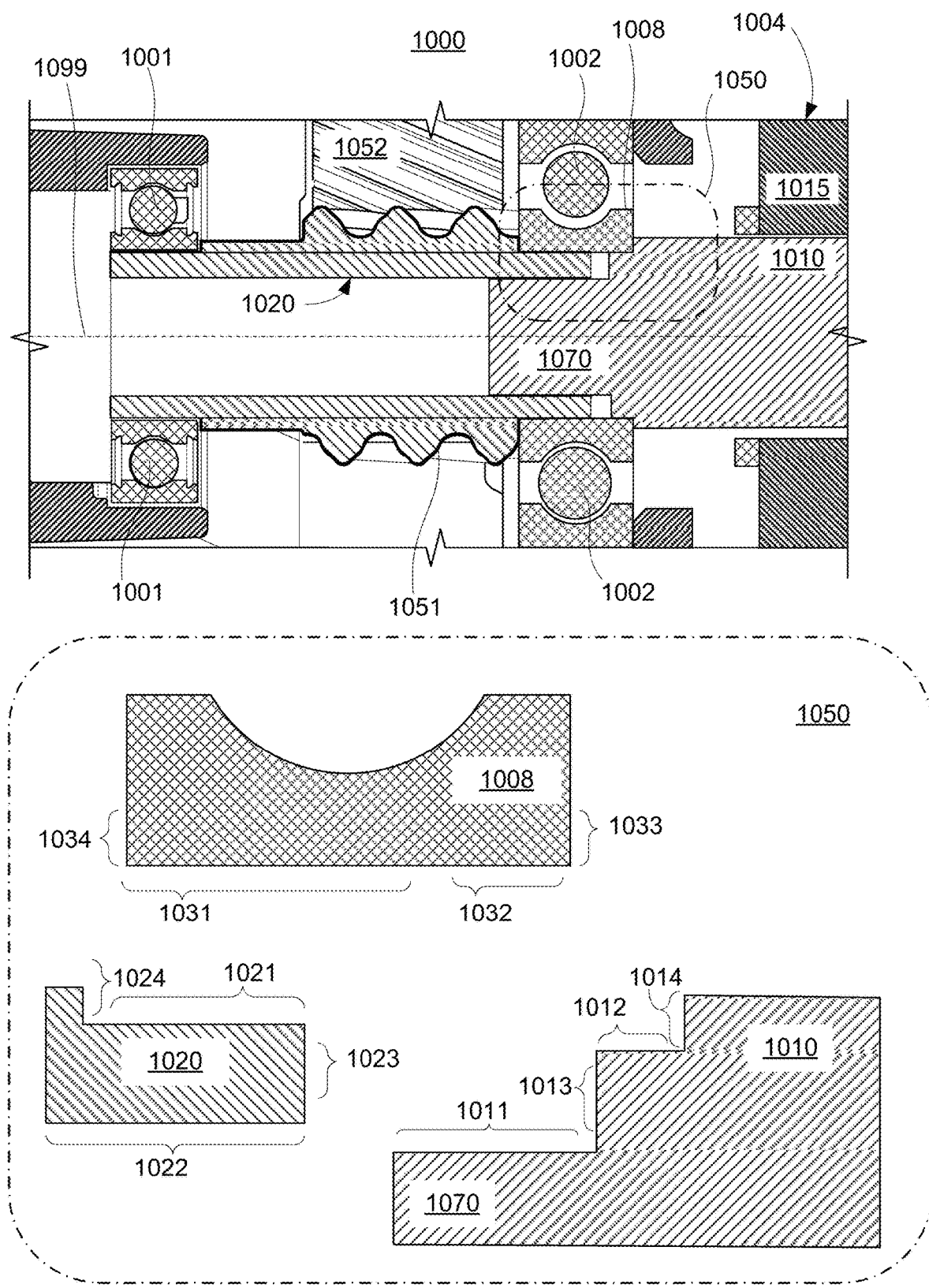
FIG. 10 shows a side cross-sectional view of a portion of an illustrative drive system having an extension of the rotor shaft, in accordance with some embodiments of the present disclosure.

FIG. 10 shows a side cross-sectional view of a portion of illustrative drive system 1000 having extension 1070 of rotor shaft 1010, in accordance with some embodiments of the present disclosure. Inset 1050 shows an enlarged, exploded view of portions of central bearing 1002 (e.g., inner race 1008 thereof), gear shaft 1020, and rotor shaft 1010. As illustrated, central bearing 1002, first bearing 1001 (e.g., interfaced to gear shaft 1020), and a second bearing (e.g., the second bearing not illustrated but interfaced to rotor shaft 1010) form a three-bearing-architecture. The three-bearing architecture constrains rotor shaft 1010 and gear shaft 1020 to rotate primarily about axis 1099. As illustrated, gear shaft 1020 includes section 1021 (e.g., a first section) and section 1022 (e.g., a second section), which are radially separate from each other and optionally axially overlapping with each other. To illustrate, sections 1021 and 1022 are arranged at one axial end of gear shaft 1020 and are nested. Collectively, sections 1021 and 1022 form an interface between gear shaft 1020, rotor shaft 1010, and inner race 1008 (e.g., a radially inner portion of a bearing having an inner diameter configured to interface with a shaft). Section 1021 interfaces to inner race 1008 of central bearing 1002 (e.g., via a splined interface), while section 1022 interfaces to rotor shaft 1010 (e.g., via another splined interface). To illustrate, the sections 1021 and 1022 may each include splines having a respective PCD, which are not be the same, as illustrated (e.g., the PCD of section 1021 is larger). To illustrate further, sections 1021 and 1022 are radially nested, and gear shaft 1020 and rotor shaft 1010 engage with each other within the PCD interface between gear shaft 1020 and inner race 1008. Inner race 1012 need not engage with (e.g., transmit torque to and from) both gear shaft 1020 and rotor shaft 1010, allowing central bearing 1002 to avoid inclusion in the torque path between rotor shaft 1010 and gear shaft 1020. In some embodiments, by allowing rotor shaft 1010 to interface to gear shaft 1020 (e.g., via a direct torque path) at central bearing 1002, gear shaft 1020 and rotor shaft 1010 (e.g., or the entire electric motor to which rotor shaft 1010 belongs) may be removed and/or installed independently.

In some embodiments, motor 1004 includes a housing that may be stationary, while rotor shaft 1010 and gear shaft 1020 may rotate about axis 1099. Motor 1004 includes stator 1015 (e.g., which includes windings, stator teeth, laminations, any other suitable components, or combination thereof), rotor shaft 1010, and the second bearing. In an illustrative example, drive system 1000 may be the same, include components of, or otherwise represent assembly 100 of FIG. 1. In a further example, each of motor drives 210 and 220 of FIG. 2 may include a respective drive system 1000, providing a three-bearing architecture for coupling the respective gear and rotor shafts. In a further example, first bearing 1001 may correspond to first bearing 101 of FIG. 1, central bearing 1002 may correspond to central bearing 102 of FIG. 1, and the second bearing of drive system 1000 may correspond to second bearing 103 of FIG. 1.

In some embodiments, drive system 1000 may be, or otherwise be included as part of, an electric vehicle drivetrain. The electric vehicle drivetrain includes motor 1004, a gearbox (e.g., which includes gear shaft 1020), and an output shaft shown in part by gear 1052 (e.g., which engages with gear 1051 of gear shaft 1020, or otherwise corresponds to either of outputs 214 or 224 of FIG. 2). Motor 1004 includes rotor shaft 1010 and a bearing (e.g., corresponding to second bearing 103). Gear shaft 1020 is configured to engage with rotor shaft 1010 at a first axial end (e.g., an end of gear shaft 1020 along axis 1099), and to engage with first bearing 1001 at another axial end (e.g., the opposite end of gear shaft 1020 along axis 1099).

In some embodiments, as illustrated, drive system 1000 includes first bearing 1001 arranged along axis 1099, a second bearing arranged along axis 1099, and central bearing 1002 arranged along axis 1099, with central bearing 1002 arranged in axially in between first bearing 1001 and the second bearing. Central bearing 1002 (e.g., inner race 1008 thereof) includes first race section 1031 configured to interface with section 1021 of gear shaft 1020, and second race section 1032 configured to interface with section 1012 of rotor shaft 1010 (e.g., as illustrated in inset 1050). First race section 1031 and second race section 1032 are separate (e.g., axially offset) from each other (e.g., axially adjacent to each other as illustrated). Section 1022 of gear shaft 1020 interfaces to section 1011 of rotor shaft 1010 via splines, keys, or any other suitable interface that allows gear shaft 1020 and rotor shaft 1010 to rotate together but be disconnected axially (e.g., during servicing).

In an illustrative example, drive system 1000 may be assembled using press fit interfaces. In some embodiments, gear shaft 1020 is axially pressed into inner race 1008 of central bearing 1002. In some embodiments, gear shaft 1020 is axially pressed into inner race 1008, and axial face 1014 of rotor shaft 1010 is axially preloaded against axial face 1033 of inner race 1008. For example, rotor shaft 1010 may be preloaded using an axial press fit (e.g., as the second bearing is secured in placed), a wave spring or other suitable axial spring, or any other suitable component or configuration that exerts an axial preload on rotor shaft 1010. In some embodiments, extension 1070 of rotor shaft 1010 extends axially into a recess or cavity of gear shaft 1020 (e.g., an extension may be defined as a portion of either a gear shaft or rotor shaft that extends axially into the other shaft). In some embodiments, axial face 1024 of gear shaft 1020 may pressed against or otherwise interface to axial face 1034 of inner race 1008. In some embodiments, axial face 1023 of gear shaft 1020 may be configured to form a gap with axial face 1013 of rotor shaft 1010. For example, the gap may prevent gear shaft 1020 and rotor shaft 1010 from axially preloading against each other, but rather each axially preloads to inner race 1008. As used herein, an axial face refers to an axially facing surface (e.g., whether flat, a flat section, a curved section, or otherwise a surface having a primarily axial facing normal vector). Sections 1022 and 1011 may interface at a splined interface, keyed interface, or other suitable interface capable of transmitting torque between gear shaft 1020 and rotor shaft 1010.

In a further illustrative example, inner race 1008 may include a total surface area defined by race sections 1031 and 1032, and optionally other sections (e.g., between or on either side of race sections 1031 and 1032). The proportion of contact area of race sections 1031 and 1032 may be a design parameter. For example, the area ratio of race section 1031 to race section 1032 (e.g., 1031:1032, in percent) may be 75:25, 80:20, 70:30, 50:50, or any other suitable ratio. In a further example, if race section 1031 has an axial length of A, and race section 1032 has an axial length of B, A may range from 50-90 percent, and B may range from 10-50 percent. To illustrate, in some embodiments, gear shaft 1020 experiences relatively greater off-axis loads (e.g., lateral loads directed off of axis 1099, or "radial loads") than rotor shaft 1010, caused by gear 1052, and accordingly race section 1031 may be longer than (e.g., has more contact area than) race section 1032. The ratio of race sections (e.g., areas or lengths thereof) may be applied to any of the drive systems of the present disclosure. For example, the area ratio between race sections 1031 and 1032 may correspond to a radial load ratio (e.g., an expected or designed for radial load ratio). In some embodiments, inner race 1008 may include an inner surface (e.g., that includes race sections 1031 and 1032) that is a cylindrical recess (e.g., without steps or other features). Any suitable bearing having a suitable inner surface may be used as central bearing 1002, for example.

Figure 11:
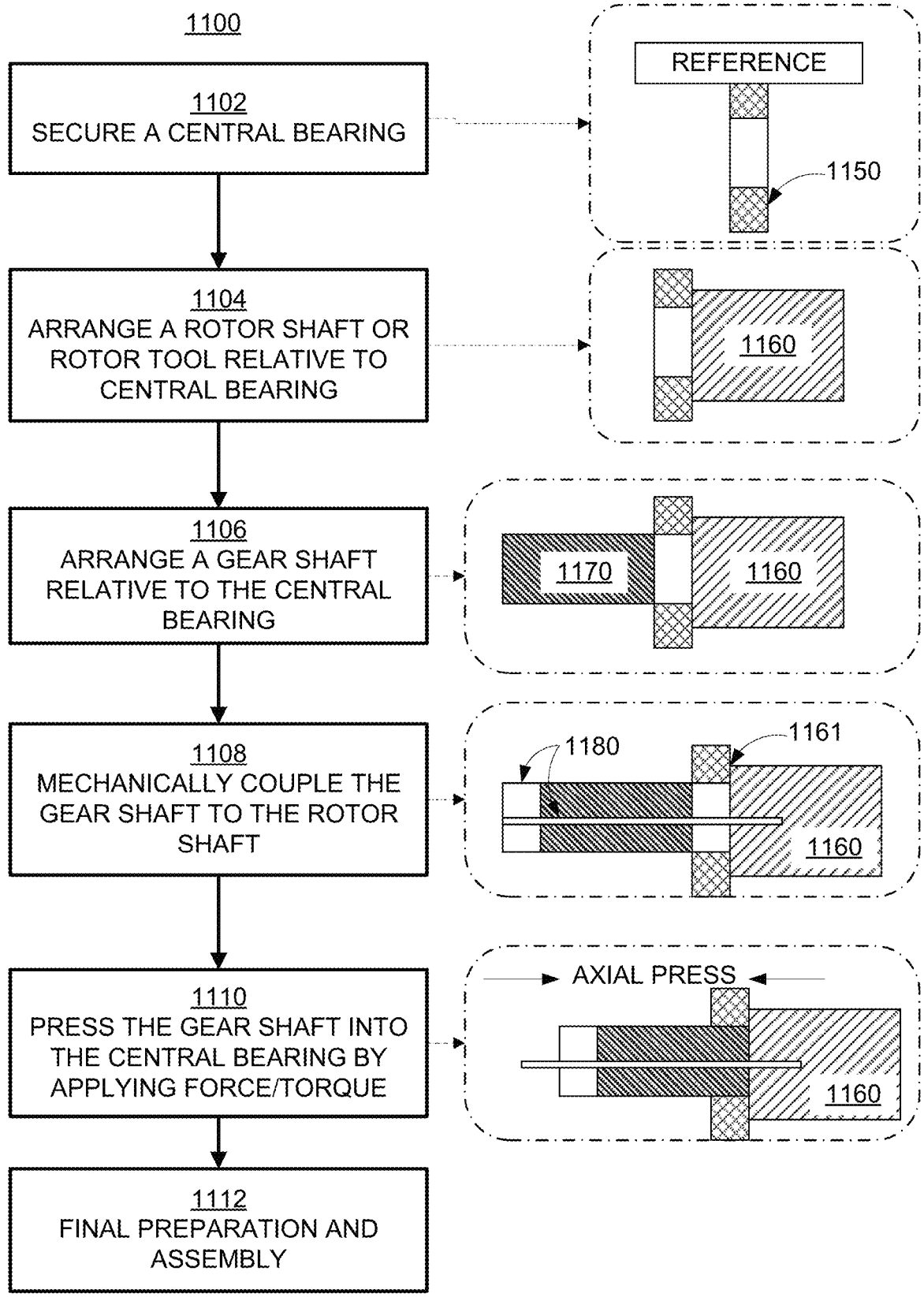
FIG. 11 is a flowchart of an illustrative process for assembling a gear shaft and a central bearing, in accordance with some embodiments of the present disclosure.

FIG. 11 is a flowchart of illustrative process 1100 for assembling a gear shaft and a central bearing, in accordance with some embodiments of the present disclosure. To illustrate, process 1100 may be used to assemble drive system 800 of FIGS. 8-9 (e.g., gear shaft 820 and central bearing 802 thereof), drive system 1000 of FIG. 10, or any other suitable assembly of the present disclosure.

Step 1102 includes securing a central bearing (e.g., central bearing 1150). In some embodiments, the central bearing may be installed in a gear box housing (e.g., press fit or otherwise affixed to the housing, indicated by "reference"). In some embodiments, the central bearing may be secured in a fixture for pressing the gear shaft, and the pressed assembly may be installed in the housing after step 1110. The central bearing may include an inner race, roller elements (e.g., balls, cylindrical rollers, tapered rollers, or any other suitable elements), and an outer structure or race. To illustrated, the central bearing may be a central bearing of a three-bearing architecture arranged along an axis.

Step 1104 includes arranging a rotor shaft (e.g., rotor shaft 1160), or a rotor tool, relative to the central bearing. The rotor shaft may be arranged using a fixture or other suitable aligning tool (e.g., tool for optically or mechanically aligning). For example, rotor shaft 1160 may be axially abutted against central bearing 1150 (as illustrated), using an axial preload (e.g., using an axial spring), an affixment (e.g., a hard stop), or a combination thereof.

Step 1106 includes arranging a gear shaft (e.g., gear shaft 1170) relative to the central bearing. In some embodiments, the gear shaft may be aligned laterally with central bearing 1150 (e.g., an inner race thereof), axially aligned with central bearing 1150 (e.g., abutted against central bearing 1150 opposite rotor shaft 1160), or a combination thereof.

Step 1108 includes mechanically coupling the gear shaft to the rotor shaft. The mechanical coupling may include any suitable components for pulling the gear shaft and rotor shaft together (e.g., applying equal and opposite axial forces on the gear shaft and rotor shaft). As illustrated, assembly 1180 is shown as mechanically coupling gear shaft 1170 and rotor shaft 1160. Illustrative assembly 1180, as illustrated, includes a central member (e.g., a threaded stud) that is engaged with rotor shaft 1160 (e.g., to transmit axial force), and also an end member (e.g., a threaded nut) arranged against gear shaft 1170 and engaged with the central member. For example, assembly 1180 represents a screw-type press, wherein torque may be applied to the end member, driving the end member axially along the central member (e.g., thus axially pushing gear shaft 1170 into bearing 1150). In some embodiments, the mechanical coupling may be a press and die assembly or fixture (e.g., rather than a rotary or screw-type tool).

Step 1110 includes pressing the gear shaft into the central bearing by applying a force, torque, or both. In some embodiments, an axial pressing force is applied to force gear shaft and rotor shaft relatively toward each other, thus pressing gear shaft 1170 into the inner race of central bearing 1150. In some embodiments, a pressing torque is applied to the end member of assembly 1180 to force gear shaft and rotor shaft relatively toward each other, thus pressing gear shaft 1170 into the inner race of central bearing 1150.

Step 1112 includes preparing the subassembly of the gear shaft and central bearing, or assembling further components. For example, after pressing, the mechanical coupling (e.g., assembly 1180) may be removed. In a further example, if a rotor tool is used, the tool may be removed and a rotor shaft may be installed.

Figure 12:
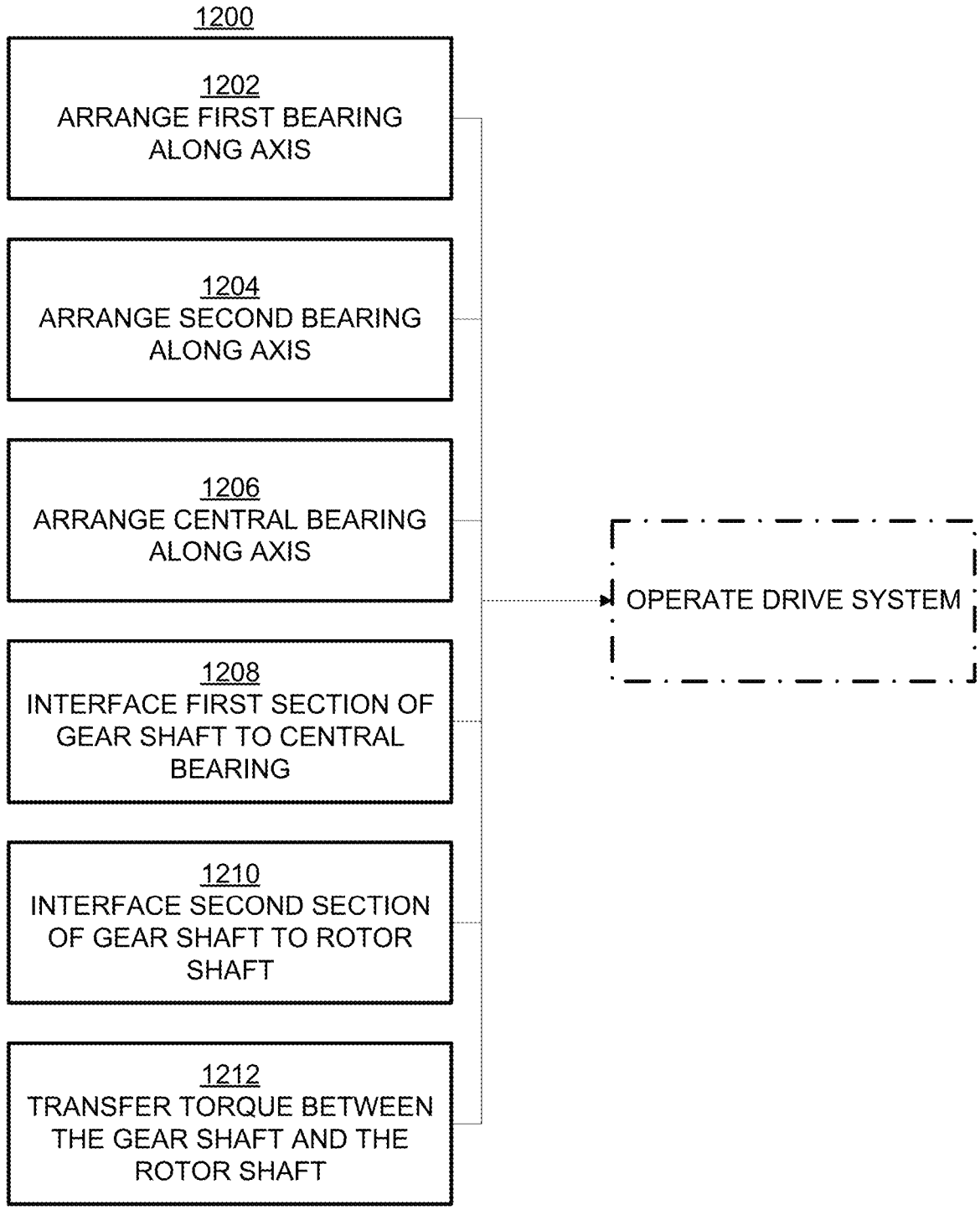
FIG. 12 is a flowchart of an illustrative process for managing interfaces between rotor shafts and gear shafts, in accordance with some embodiments of the present disclosure.

FIG. 12 is a flowchart of illustrative process 1200 for managing interfaces between rotor shafts and gear shafts, in accordance with some embodiments of the present disclosure. In some embodiments, for example, process 1200 is directed to forming a three-bearing architecture. To illustrate, process 1200 may be used to form at least part of assembly 100 (e.g., having three-bearing architecture 106) of FIG. 1, either or both of motor drives 210 and 220 of FIG. 2, drive system 300 of FIG. 3, drive system 600 of FIG. 6, or drive system 700 of FIG. 7, for example.

Step 1202 includes arranging a first bearing along an axis. In some embodiments, the first bearing is mounted in a gearbox and is configured to interface to the gear shaft. For example, the first bearing may engage with the gear shaft at an axial end distal to the interface between the gear shaft and the rotor shaft.

Step 1204 includes arranging a second bearing along the axis. In some embodiments, the second bearing is mounted to, or otherwise included as part of, a motor and is configured to interface to the rotor shaft. For example, the second bearing may engage with the rotor shaft at an axial end distal to the interface between the gear shaft and the rotor shaft.

Step 1206 includes arranging a central bearing along the axis between the first bearing and the second bearing. In some embodiments, the central bearing is mounted in a gearbox and is configured to interface to the gear shaft and the rotor shaft. For example, the central bearing may engage with the gear shaft at the other axial end of the gear shaft from the first bearing.

Step 1208 includes interfacing a first section of a gear shaft to the central bearing. In some embodiments, step 1208 includes engaging splines or keys between the gear shaft and the inner face of the central bearing. In some embodiments, step 1208 includes pressing the gear shaft and the central bearing together to form a press-fit interface. In some embodiments, step 1208 includes axially sliding the gear shaft into the inner race of the central bearing to form a slip-fit interface. Any suitable technique may be used to interface the gear shaft (e.g., a section or a land thereof) to the central bearing (e.g., a section or land of an inner race thereof).

Step 1210 includes interfacing a second section of the gear shaft to a rotor shaft, wherein the second section is axially offset from the first section. In some embodiments, step 1210 includes engaging spline or keys between the gear shaft and the rotor shaft. In some embodiments, step 1210 includes axially connecting the gear shaft and the rotor shaft such that the gear shaft and the rotor shaft are constrained to rotate together (e.g., the shafts may be slid together axially to engage splines). Any suitable technique may be used to interface the gear shaft (e.g., a section or a land thereof) to the rotor shaft (e.g., a section or land of an inner race thereof).

Step 1212 includes transferring torque between the gear shaft and the rotor shaft. Because the gear shaft engages with the rotor shaft without the inner race of the central bearing being intermediate, the drive torque (e.g., the torque transmitted between the motor and the wheels) is transferred directly. For example, the torque may be transferred in either or both directions, depending upon whether (i) the wheels are being driven (e.g., during acceleration) or (ii) the wheels are generating electric power in the motor (e.g., during regenerative braking).

In an illustrative example, misalignment, fretting (e.g., of splines), and manufacturability of the designed tolerances may be of concern. In some embodiments, the designs of the present disclosure route the torque and reaction forces on simplified paths, which may produce more mass-efficient and simplified geometry. In some embodiments, each interface is clearly defined by the function it needs to provide, and torsional, compressive, and tensile load paths are generally separated to transfer at different interfaces, and each interface can be optimized for, or otherwise designed for, the loads it needs to transfer.

In an illustrative example, steps 1208 and 1210 may include or otherwise correspond to process 1100 of FIG. 11. For example, the gear shaft may be pressed into the central bearing by axially reacting against the rotor shaft, thus pressing the gear shaft into the inner race of the central bearing by using an axial normal force between the central bearing and the rotor shaft (e.g., to avoid axially loading the central bearing against the gearbox housing).

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An apparatus comprising:
a central bearing comprising an inner race having a first race section and a second race section, wherein:
the first race section comprises splines configured to interface with a gear shaft, wherein the splines are crowned to allow misalignment compliance between the gear shaft and a rotor shaft;
the second race section is configured to interface with the rotor shaft.

2. The apparatus of claim 1, further comprising:
a first bearing configured to interface with the gear shaft; and
a second bearing configured to interface with the rotor shaft, wherein:
the central bearing is arranged axially between the first bearing and the second bearing, and wherein the first bearing, the second bearing, and the central bearing form a three-bearing architecture arranged along an axis.

3. The apparatus of claim 1, wherein:
the second race section is configured to form a slip fit with the rotor shaft.

4. The apparatus of claim 1, wherein the first race section is configured to interface with the gear shaft using a press fit.

5. The apparatus of claim 1, wherein:
the first race section comprises a first surface area;
the second race section comprises a second surface area; and
the first surface area is greater than the second surface area.

6. The apparatus of claim 1, wherein the first race section comprises an inner diameter and the second race section comprises the inner diameter.

7. The apparatus of claim 1, wherein the gear shaft comprises:
a first shaft configured to interface with the first race section and comprising a hollow interior; and
a stub shaft arranged radially within the hollow interior of the first shaft and configured to interface with the rotor shaft, and wherein the stub shaft is configured to be constrained to rotate with the first shaft.

8. A gear shaft comprising:
a first section configured to interface with an inner race of a central bearing of a three-bearing architecture, wherein the first section comprises first splines, wherein the first splines are crowned to allow misalignment compliance between the gear shaft and a rotor shaft; and
a second section configured to interface with the rotor shaft of a motor along an axis, wherein the first section and the second section are axially separate from each other.

9. The gear shaft of claim 8, wherein:
the gear shaft is configured to interface to a first bearing; and
the rotor shaft is configured to interface to a second bearing, wherein the central bearing is configured to be arranged axially between the first bearing and the second bearing, and wherein the first bearing, the second bearing, and the central bearing form the three-bearing architecture.

10. The gear shaft of claim 8, wherein:
the inner race comprises first mating splines configured to interface with the first splines; and
the second section comprises second splines and the rotor shaft comprises second mating splines configured to interface with the second splines.

11. The gear shaft of claim 10, wherein the second splines are crowned to allow misalignment compliance.

12. The gear shaft of claim 8, wherein the gear shaft is configured to be press fit into the inner race along the first section.

13. The gear shaft of claim 8, wherein the first section and the second section have the same pitch circle diameter.

14. The gear shaft of claim 8, wherein there is a direct torque path between the rotor shaft and the gear shaft.

15. The gear shaft of claim 8, wherein the central bearing is configured to maintain a position of the gear shaft when the rotor shaft is removed such that the rotor shaft is independently serviceable.

16. The gear shaft of claim 9, wherein the gear shaft comprises:
- a first shaft comprising the first section and a hollow interior; and
- a stub shaft comprising the second section, wherein the stub shaft is arranged radially within the hollow interior of the first shaft, and wherein the stub shaft is constrained to rotate with the first shaft.

17. An assembly comprising:
- a rotor shaft configured to engage with a first bearing; and
- a gear shaft configured to engage with the rotor shaft at a first axial end, and configured to engage with a second bearing at another axial end, wherein:
  - the gear shaft comprises a first section and a second section at the first axial end;
  - the first section comprises splines, wherein the splines are crowned to allow misalignment compliance between the gear shaft and the rotor shaft;
  - the first section interfaces to an inner race of a central bearing arranged axially between the first bearing and the second bearing; and
  - the second section interfaces to the rotor shaft to transmit torque.

18. The assembly of claim 17, wherein the first bearing, the second bearing, and the central bearing form a three-bearing architecture.

19. The assembly of claim 17, wherein the gear shaft comprises:
- a first shaft configured to interface with the inner race of the central bearing and comprising a hollow interior; and
- a stub shaft arranged radially within the hollow interior of the first shaft and configured to interface with the rotor shaft, and wherein the stub shaft is configured to be constrained to rotate with the first shaft.

* * * * *